(12) United States Patent
Chen et al.

(10) Patent No.: US 10,424,894 B2
(45) Date of Patent: Sep. 24, 2019

(54) PASSIVELY Q-SWITCHED FIBER LASER SYSTEM AND METHOD FOR FABRICATING A SATURABLE ABSORBER OF THE SYSTEM

(71) Applicant: NATIONAL TAIPEI UNIVERSITY OF TECHNOLOGY, Taipei (TW)

(72) Inventors: Chien-Ming Chen, Taipei (TW); Yin-Wen Lee, Taipei (TW); Chia-Wei Huang, Taipei (TW); Shih-Ken Chen, Taipei (TW); Jhang-Rong Jiang, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 15/494,678

(22) Filed: Apr. 24, 2017

(65) Prior Publication Data

US 2018/0123313 A1 May 3, 2018

(30) Foreign Application Priority Data

Oct. 28, 2016 (TW) .............................. 105134993 A

(51) Int. Cl.
*H01S 3/067* (2006.01)
*H01S 3/113* (2006.01)
*H01S 3/16* (2006.01)
*H01S 3/10* (2006.01)

(52) U.S. Cl.
CPC .......... *H01S 3/06791* (2013.01); *H01S 3/113* (2013.01); *H01S 3/06712* (2013.01); *H01S 3/10046* (2013.01); *H01S 3/1608* (2013.01)

(58) Field of Classification Search
CPC .. H01S 3/06791; H01S 3/113; H01S 3/06712; H01S 3/10046; H01S 3/1608
See application file for complete search history.

(56) References Cited

PUBLICATIONS

Panzer et al. "Tunable Infrared Emission From Printed Colloidal Quantum Dot/Polymer Composite Films on Flexible Substrates" Journal of Display Technology, vol. 6, No. 3 2010 pp. 90-93.*
Lee et al., "Passively Q-switched Er3+-doped fiber lasers using colloidal PbS quantum dot saturable absorber," May 16, 2016, Optics Express, vol. 24, No. 10, pp. 10675-10681.

* cited by examiner

*Primary Examiner* — Robert S Walters, Jr.
(74) *Attorney, Agent, or Firm* — Bacon & Thomas, PLLC

(57) ABSTRACT

A passively Q-switched fiber laser system comprises a pump source and an ring cavity connected with each other. The ring cavity comprises a gain fiber, a directional coupler and a saturable absorber connected in order. The saturable absorber is a quantum-dot polymer composite film, which is fabricated by a simple method comprising steps of: mixing a quantum dot material of lead sulfide (PbS) with a colloidal polymer to form a mixture; and drying the mixture at two different temperatures in two stages respectively. The saturable absorber of the present invention has lower saturating intensity and a plurality of absorption bands comprising 1000 nm to 1100 nm and 1500 nm to 1600 nm. The maximum output power and the maximum pulse energy of the passively Q-switched fiber laser system can be superior to those laser systems using the quantum-dot (QD) polymer composite film as saturable absorber.

5 Claims, 6 Drawing Sheets

PASSIVELY Q-SWITCHED FIBER LASER SYSTEM AND METHOD FOR FABRICATING A SATURABLE ABSORBER OF THE SYSTEM

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S)

(1) Yin-Wen Lee, Chien-Ming Chen, Chia-Wei Huang, Shih-Ken Chen, and Jhang-Rong Jiang, "Passively Q-switched $Er^{3+}$-doped fiber lasers using colloidal PbS quantum dot saturable absorber," OPTICS EXPRESS Vol. 24, No. 10, 10675-10681 (2016).

BACKGROUND OF THE INVENTION (1) Field of the Invention

The present invention relates to a fiber laser system and a method for fabricating an operating element of the fiber laser system, in particular, to a passively Q-switched fiber laser system applying a novel saturable absorber as the operating element, and a method for fabricating the novel saturable absorber.

(2) Description of the Prior Art

Fiber laser has brought about many breakthroughs and progresses into the field of laser application, has replaced gas laser and traditional solid laser gradually and has become a tendency in the field of laser currently. Compared with traditional solid laser, fiber laser has such advantages as low laser threshold, high energy conversion efficiency, high beam quality, long service life, high stability etc., wherein the passively Q-switched fiber laser system is relative simple and more cost-effective.

The three main parts needed for constituting a fiber laser system are pump source, gain medium and resonance cavity. The gain medium is stimulated by the pump source to be an excited state for generating a stimulated radiation, which is amplified to form a laser after consistent oscillations inside the resonance cavity. By means of changing the design of optical devices inside the resonance cavity, two different types of laser output, continual and pulse, may be generated by the fiber laser system.

The pulsed fiber laser system may also be classified into a Q-switched laser and a mode-locked laser. The Q-switched laser generates a giant pulse with a peak power of about 100 kilowatt by compressing the pulse wand to nano-second (ns) magnitude; the mode-locked laser generates a giant pulse with a higher peak power than the Q-switched laser by compressing the pulse wand to pico-second (ps) magnitude or femto-second (fs) magnitude.

Q-switching may be classified into actively Q-switching and passively Q-switching. In actively Q-switched fiber laser systems, extensive and complex fiber pigtailed acousto-optic or electric optic devices are generally required. In such fiber laser systems, the use of high voltages and radio-frequency trigger sources makes these systems expensive and complex. Unlike actively Q-switched laser systems, passively Q-switched fiber laser systems could be made much simpler and more cost-effective by adopting saturable absorbers (SAs).

Traditional saturable absorber material includes semiconductor saturable abosorber mirrors (SESAMs), carbon nanotubes (CNTs) and graphene etc. Although SESAMs have been widely used and commercialized, their operation wavelength ranges are relatively small, they are expensive and they has a complicated processing. Although CNTs have a low saturation energy and a fast recovery, their absorbable bandwidths are relatively narrow and they are easy to be damaged. Although the graphene has a lower cost and easy fabrication, the modulation depth could be small.

If a novel saturable absorber material is developed to have properties such as large operation wavelength range, cost-effectiveness, and a low saturable absorption intensity etc., the saturable absorber material may be applied to optimize the passively Q-switched fiber laser system.

SUMMARY OF THE INVENTION

One object of the present invention is to provide a passively Q-switched fiber laser system, which employs a novel saturable absorber material to enhance the maximum output power and the maximum pulse energy of the pulsed laser beam.

Another object of the present invention is a method for fabricating a novel saturable absorber of the passively Q-switched fiber laser system, the fabricated saturable absorber has a large operation wavelength range, cost-effectiveness, and a low saturable absorption intensity.

In order to effectively achieve foregoing object aforesaid, the present invention provides a passively Q-switched fiber laser system comprising a pump source and a ring cavity. The pump source is used to generate a pump beam. The ring cavity is used to receive the pump beam for generating a pulsed laser beam. The ring cavity comprises a wavelength division multiplexer, a gain fiber doped with a rare earth ion, and a directional coupler connected in order, and comprises a saturable absorber connected between the directional coupler and the wavelength division multiplexer. The saturable absorber and the pump source are connected at the same end of the wavelength division multiplexer together. The directional coupler has a connecting end and an output end, the connecting end is used to connect with the saturable absorber, the output end is used for the pulsed laser beam to emit out from the ring cavity. The saturable absorber is a lead sulfide quantum-dot polymer composite film, referred to as a PbS QD polymer composite film below. The PbS QD polymer composite film has a plurality of absorption bands comprising 1000 nm to 1100 nm and 1500 nm to 1600 nm. The gain fiber emits the pulsed laser beam at a wavelength region corresponding to one of the plurality of absorption bands. And, the PbS QD polymer composite film is fabricated by mixing a quantum dot material of lead sulfide with a colloidal polymer to form a mixture and drying the mixture. Wherein, steps of drying comprise drying at a first temperature firstly and then drying at a second temperature, wherein the second temperature is higher than the first temperature.

In an embodiment of the system, the rare earth doped in the gain fiber is selected from a group consisting of ytterbium ion, erbium ion, thulium ion and neodymium ion.

In an embodiment, the system further comprises a polarization controller connected between the gain fiber and the directional coupler, to optimize the waveform of the pulse beam.

In an embodiment of the system, the system further comprises a mechanical joint connected between the directional coupler and the wavelength division multiplexer, wherein the saturable absorber is disposed inside the mechanical joint.

In an embodiment of the system, a concentration of the PbS QD material contained in the saturable absorber is ranged from $2\times10^{-3}$ mol/L to $2\times10^{-1}$, the saturable absorber has a thickness larger than 0 μm and less than 100 μm and an absorption spectrum including a peak falling in the wavelength range of 1500 nm to 1600 nm.

In an embodiment, the system further comprises a second pump source, a second wavelength division multiplexer and a second gain fiber, the output end of the directional coupler and the second pump source are connected to the same end of the second wavelength division multiplexer together, the other end of the wavelength division multiplexer is connected to the second gain fiber.

Besides, the present invention provides a method for fabricating the saturable absorber of the passively Q-switched fiber laser system, the method comprises steps of: distributing uniformly a quantum dot material of lead sulfide into a colloidal polymer to form a mixture; subsequently, coating the mixture on a supporter to form a coating; and drying the coating at a first temperature firstly for a first stage drying, then drying at a second temperature for a second stage drying to form the PbS QD polymer composite film, wherein the second temperature is higher than the first temperature.

In an embodiment, the quantum dot material of lead sulfide is soaked in toluene solution to form a lead sulfide quantum-dot toluene solution, the colloidal polymer is xylene polymer, wherein steps of forming the mixture comprises: mixing the lead sulfide quantum-dot toluene solution with the polymer xylene in a volume ratio at a lower temperature to form the mixture, wherein the lower temperature is ranged from 0° C. to 8° C., the volume ratio of the lead sulfide quantum-dot toluene solution to the polymer xylene in the mixture is n to 1, where n is a specific value ranged from 0.5 to 4; and oscillating the mixture in a supersonic oscillator after oscillating in a contact oscillator.

In an embodiment of the method, the first temperature in the drying steps is ranged from 0° C. to 8° C., the first drying stage is a freeze drying process, and the second temperature is ranged from 20° C. to 30° C., the second drying stage is a natural air drying process.

In an embodiment of the method, the freeze drying process is executed for 2 to 3 days, and the natural air drying process is executed for 1 day.

The method for fabricating the saturable absorber in the present invention is simple, having the property of low saturable absorption intensity and providing such a plurality of absorption bands that it can be used separately with gain fiber of different doped ions or emission wavelength regions. This saturable absorber may be used to allow the passively Q-switched fiber laser system to have a plurality of operation bands, and enhance the maximum output power and the maximum pulse energy of the system.

DESCRIPTION OF THE PREFERRED EMBODIMENTS

Regarding technical contents, features and effects disclosed above and other technical contents, features and effects of the present invention will be clearly presented and manifested In the following detailed description of the exemplary preferred embodiments with reference to the accompanying drawings which form a part hereof. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

Figure 1:
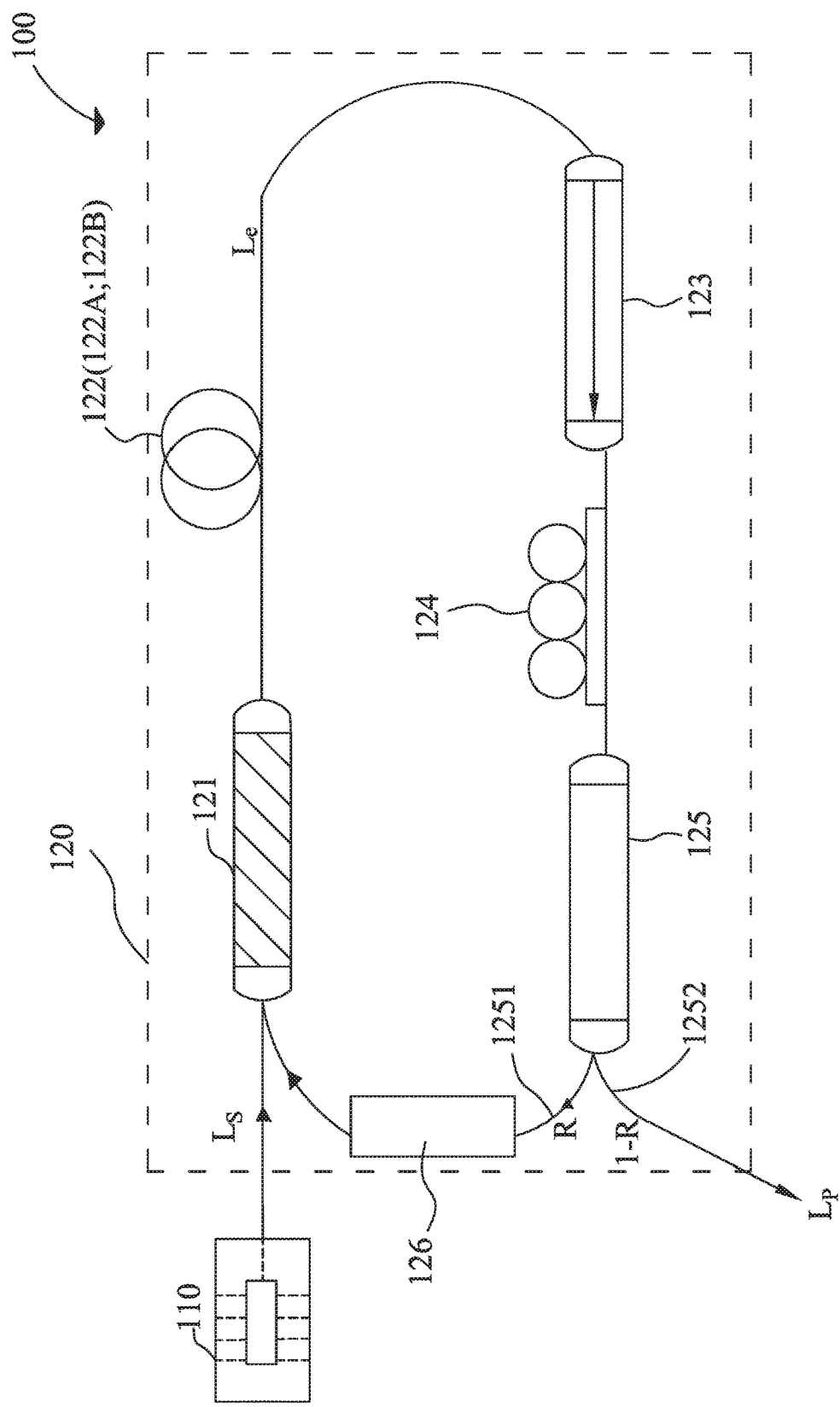
FIG. 1 is a schematic view of the passively Q-switched fiber laser system according to the first to third embodiments of the present invention.

(First Embodiment) FIG. 1 is a schematic view of the passively Q-switched fiber laser system according to the first embodiment of the present invention. The passively Q-switched fiber laser system 100 comprises a pump source 110 and a ring cavity 120. The pump source 110 is directly connected to the ring cavity 120. In the first embodiment, the pump source 110 is a semiconductor laser with 155 mW power and can generate a continual laser beam with a wavelength of 976 nm, the continual laser beam is called pump beam $L_S$ as below and serves as an incident beam of the ring cavity 120. The ring cavity 120 comprises a wavelength division multiplexer 121, a gain fiber 122, an optical isolator 123, a polarization controller 124, a directional coupler 125 and a saturable absorber 126 connected in order, wherein the saturable absorber 126 is connected between the directional coupler 125 and the wavelength division multiplexer 121 to form a ring structure. The ring cavity 120 has a total length of 10 meters. The gain fiber 122 is a single mode fiber doped with erbium ion ($Er^{3+}$), and is referred to as "erbium-doped fiber 122A" in the first embodiment. It should be noted that the saturable absorber 126 of the first embodiment is a lead sulfide (PbS) quantum-dot (QD) polymer composite film, which is a colloidal thin film formed by mixing a PbS QD material with a colloidal polymer and then drying them. The PbS QD material has a diameter of about 6.8 nm. Incidentally, the diameter of QD relates to energy level, and the emission wavelength of QD can be changed by adjusting the diameter of QD.

Figure 2:
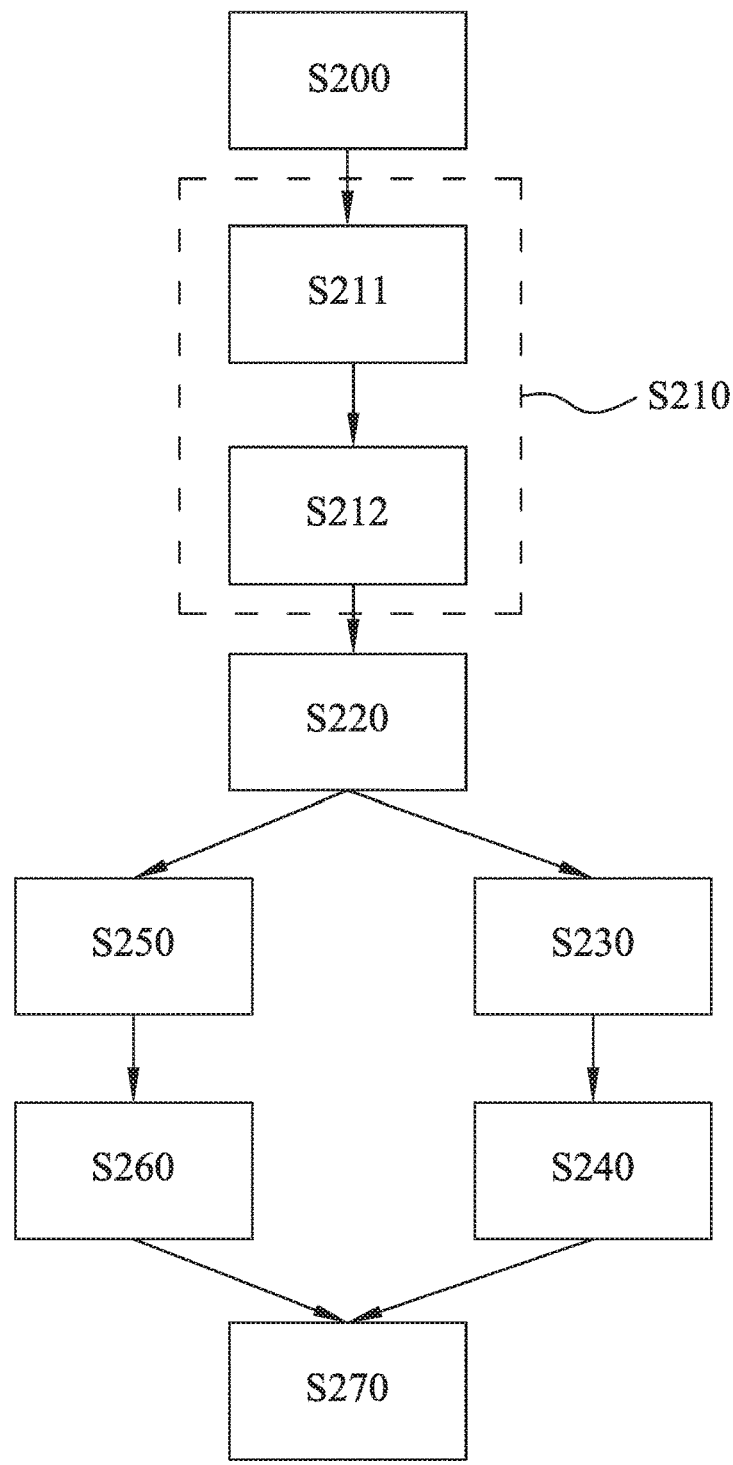
FIG. 2 is a flow chart of the method for fabricating the saturable absorber applied in one embodiment of the present invention.

FIG. 2 is a flow chart of the method for fabricating the saturable absorber applied in any embodiments of the present invention. The QD material of PbS is soaked in a toluene solution with a concentration of 10 mg/ml to form a PbS QD toluene solution. First of all, mixing the PbS QD toluene solution with a emission wavelength of 1600 nm with a colloidal polymer in a volume ratio of 1:1 at 4° C. to form a mixture, for example: 1 ml PbS QD toluene solution is extracted to be mixed with 1 ml colloidal polymer xylene at 4° C. (S200). Next, executing steps of oscillating the mixture (S210), the steps comprises: firstly oscillating the mixture by a contact oscillator at 3200 rpm for about 5 mins to distribute the PbS QDs uniformly in the polymer xylene (S211); then oscillating in a supersonic oscillator for about 5 mins (S212). As the former two steps (S200 and S211) may produce many tiny bubbles, this step (S212) is used to combine these tiny bubbles for cracking after floating on the surface gradually, therefore elimination of these tiny bubbles in a mixture can be achieved. And then coating the uniform mixture onto a clean glass slide or a suitable supporter to form a coating (S220).

The subsequent processing after coating can be operated in two ways: 1. Standing the coating at a low temperature (for example: in a refrigerator of 4° C.) ranged from 0° C. to 8° C. for freeze drying about 2 to 3 days (S230); then putting the coating from the refrigerator at room temperature ranged from 20° C. to 30° C. for natural drying about 1 day (S240) until a complete air drying; after forming a PbS QD polymer composite film from the complete air drying, here, the PbS QD polymer composite film can be removed from the glass slide (S270). 2. If not standing the coating continuously in the refrigerator of 4° C. for about 2 to 3 days but directly standing it at room temperature for natural air drying (S250), an annealing step can be added for the follow-ups: disposing the coating at 35° C. for 1 hour, then cooling it from 35° C. to room temperature (S260); as such, a required PbS QD polymer composite film can also be fabricated (S270).

The PbS QD polymer composite film formed by drying the coating of mixture as discussed above can tolerate higher temperatures and needs not to be stored in a freezing environment. The well-fabricated PbS QD polymer composite film has a thickness of about 30 μm and contains PbS quantum-dot material concentration of $2.1 \times 10^{-2}$ mol/L. In one exemplary embodiment of the present invention, the thickness of the saturable body can be larger than 0 jam and less than 100 μm, and the concentration of the PbS quantum-dot material contained in the saturable body is ranged from $2.1 \times 10^{-3}$ mol/L to $2.1 \times 10^{-1}$ mol/L.

Figure 3:
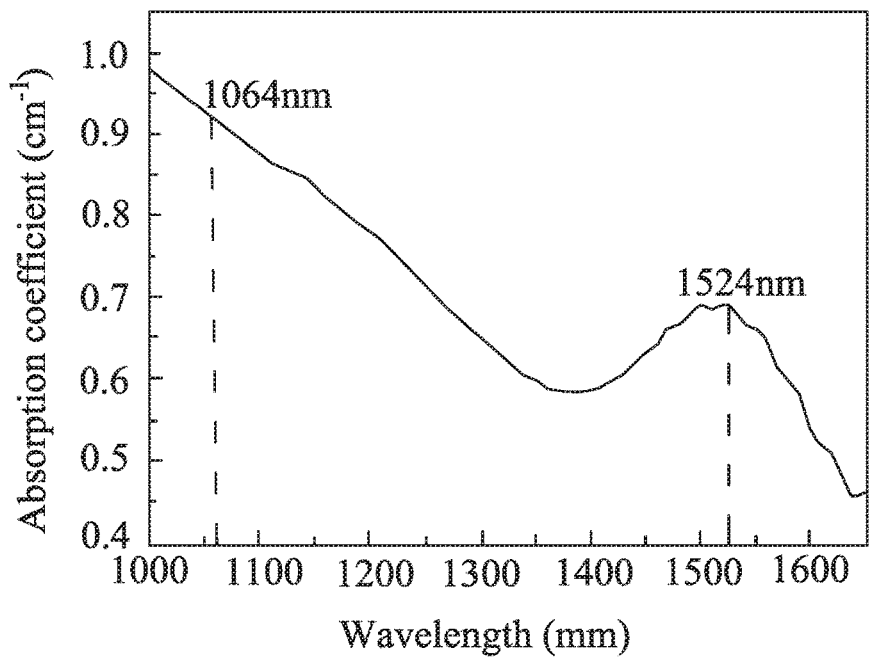
FIG. 3 is the absorption spectrum of the lead sulfide quantum-dot polymer composite film according to one embodiment of the present invention.

In FIG. 3, by scanning the 1000-1600 nm wavelength range, there is an obvious trough at the wavelength of 1400 nm in the absorption spectrum of the PbS QD polymer composite film, and by dividing the whole scanning range into two bands that are 1000 nm to 1400 nm and 1400 nm to 1600 nm etc. respectively, the peak falling in the wavelength range of 1400 nm to 1600 nm is at 1524 nm. Within the above two wavelength ranges, more important absorption wavelengths are in the range of 1000 nm to 1100 nm and 1500 nm to 1600 nm, for example: wavelength of 1064 nm, of 1550 nm and of 1565 nm.

Figure 4:
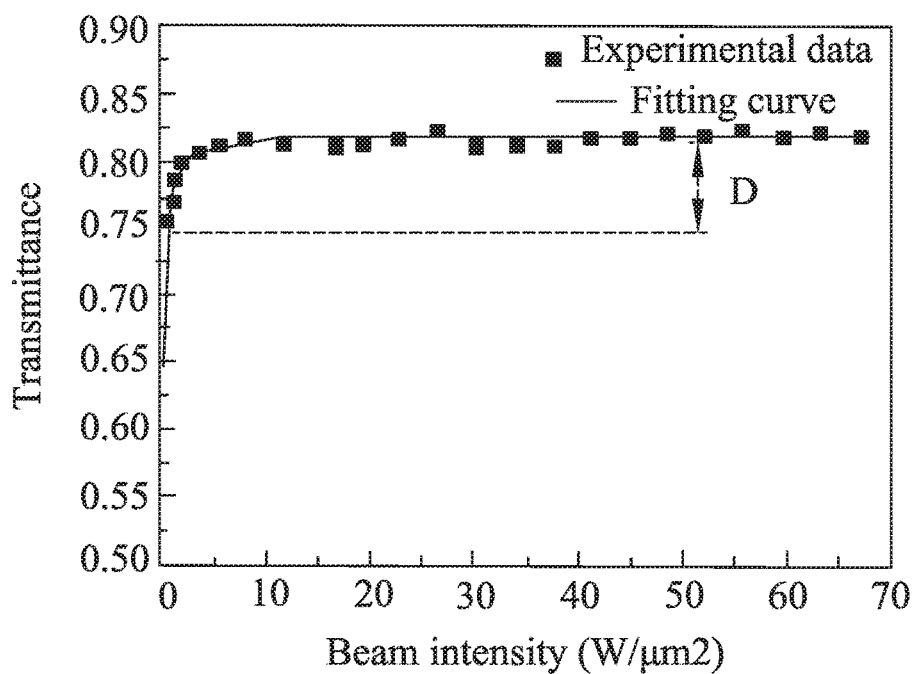
FIG. 4 is a measured characteristic curve of the transmittance according to one embodiment of the present invention.

FIG. 4 is a measurement chart of the transmittance of different incident beam intensities through the PbS QD polymer composite film under laser beam with wavelength of 1565 nm. The modulation depth D of light transmittance of the PbS QD polymer composite film is about 6%; the saturable absorption intensity is 0.047 W/μm².

Figure 5:
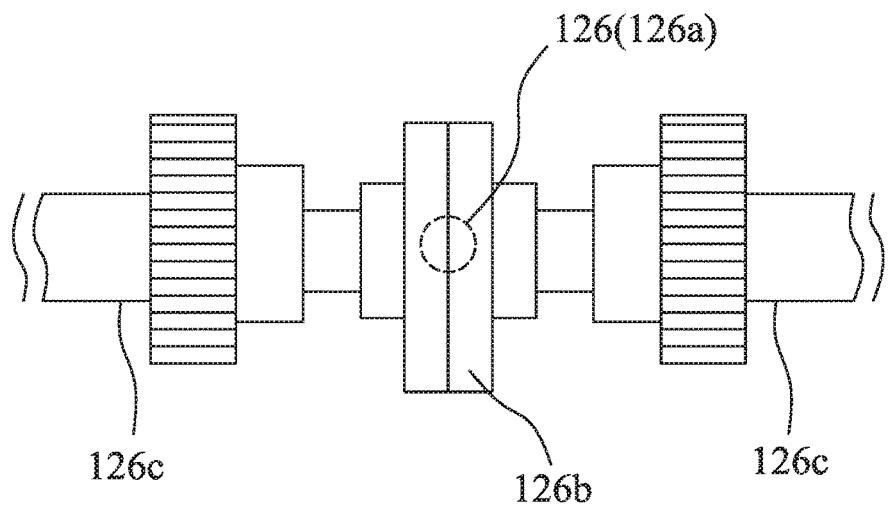
FIG. 5 is a schematic view of the saturable absorber put into the mechanical joint according to one embodiment of the present invention.

In FIG. 5, in order to mount the PbS QD polymer composite film 126a into the ring cavity 120, the PbS QD polymer composite film 126a can be disposed in a mechanical joint 126b, and both ends of the mechanical joint 126b are connected with a jumper wires 126c respectively. The other end of the two jumper wires 126c is connected with the directional coupler 125 and a wavelength division multiplexer 121 respectively. As the saturable absorber in the first embodiment is a colloidal thin film device, it has a quite good ductility and can still be put into the mechanical joint 126b with no damage to original structure though the mechanical joint has a relative narrow space.

It can been seen from the absorption spectrum of the PbS QD polymer composite film 126a in FIG. 3 that there is an obvious absorption peak at the wavelength of 1524 nm, so the PbS QD polymer composite film 126a is placed into the passively Q-switched fiber laser system 100 with wavelength of 1.55 μm as its saturable absorber 126. In the first embodiment, the pump beam $L_S$ produced by the pump source 110 emits through the wavelength division multiplexer 121 and then into the erbium-doped fiber 122A with a length of 2 meters, the emission wavelength region of the erbium-doped fiber 122A ranges from 1530 nm to 1570 nm. In the first embodiment, the erbium ion in the erbium-doped fiber 122A is stimulated by the pump beam with a wavelength of 976 nm to release an stimulated laser beam $L_e$ with a wavelength of 1.55 μm. Next, the stimulated laser beam $L_e$ passes through the optical isolator 123 to make the stimulated laser beam $L_e$ move in a single direction and avoid the damage on the ring cavity 120 caused by the stimulated laser beam $L_e$ being reflected. Then, after passing through the polarization controller 124, the stimulated laser beam $L_e$ emits into the directional coupler 125 for transferring 50% energy of the stimulated laser beam $L_e$ back to the ring cavity 120 and into the saturable absorber 126 by means of a connecting end 1251 of the directional coupler 125, and the other 50% energy is emitted out from the ring cavity 120 through an output end 1252 of the directional coupler 125, i.e. to be the pulsed laser beam $L_P$ output from the passively Q-switched fiber laser system 100. The laser beam back to the ring cavity 120 is coupled into the wavelength division multiplexer 121 with the pump beam $L_S$ after passing through the saturable absorber 126. The energy ratio of the laser beam transferred back to the ring cavity is called "reflectivity R" as below.

In order to measure the property of the pulsed laser beam $L_p$ outside the ring cavity 120, the output end 1252 of the directional coupler 125 can be also connected with another directional coupler (not shown), and then 10% energy of the pulsed laser beam $L_P$ out from the ring cavity 120 is connected with a photodetector (not shown) by another directional coupler to be converted into an electrical signal, and after that an oscilloscope (not shown) connected for being ready to observe its output waveform. The other 90% energy of the pulsed laser beam is connected to an optical power meter (not shown).

Figure 6:
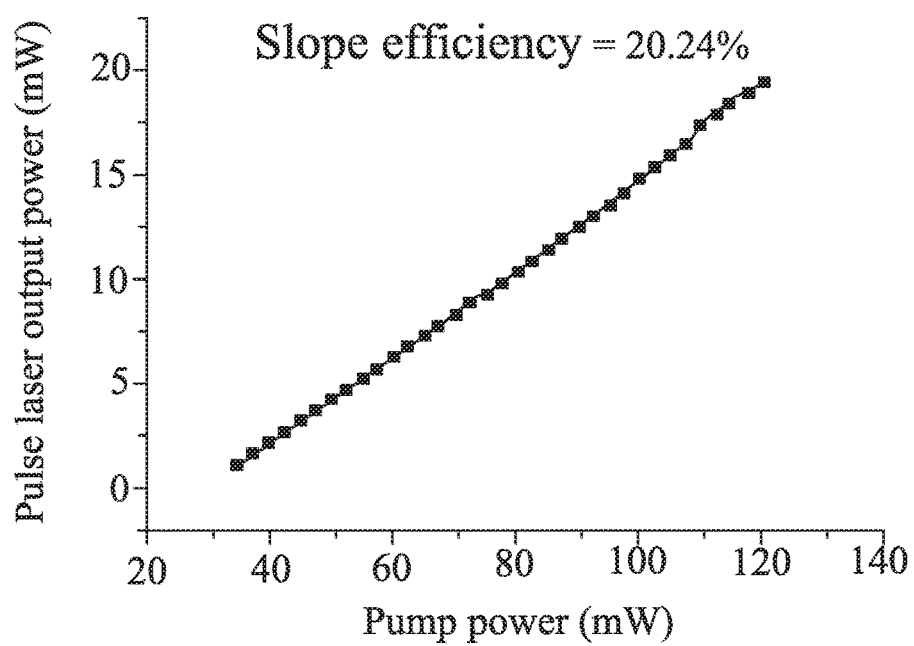
FIG. 6 shows the slope efficiency of the passively Q-switched fiber laser system according to one embodiment of the present invention.

In FIG. 6, drawing a curve, in which the pump power being X-axis, pulse laser output power being Y-axis and the slope of the curve is the optical fiber laser system slope efficiency. The slope efficiency of the passively Q-switched fiber laser system 100 in the first embodiment is 20.24%. Compared with the system employing traditional saturable absorber material, for example: the slope efficiency of the system employing SESAMs is 18%, the slope efficiency of the system employing CNTs is 3.18%, the slope efficiency of the system employing graphene is 1.86%, so the slope efficiency of the passively Q-switched fiber laser system 100 in the first embodiment is relatively higher.

Figure 7:
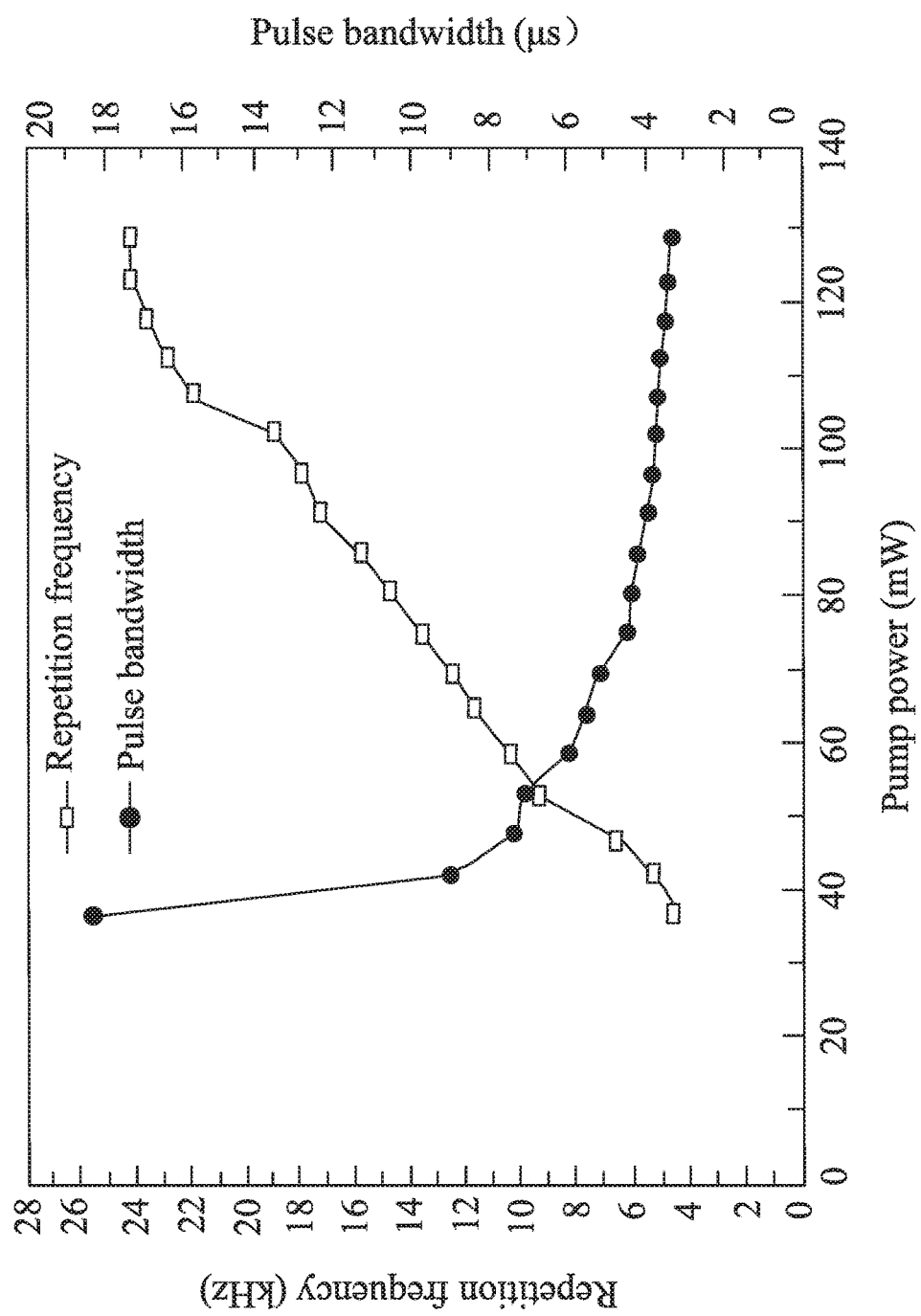
FIG. 7 shows the change relationships of the repetition frequency and the pulse bandwidth versus the pump power.

During operation, the erbium-doped fiber 122A begins to output continual beam when the output power of the pump source 110 reaches 30.8 mW. After increasing input current to the pump source 110 consistently, the stimulated laser beam $L_e$ output from the erbium-doped fiber 122A begins to convert from the continual beam into the pulse beam when the output power of the pump source 110 (referred to as "pump power" as below) reaches 36.4 mW. The waveform of pulse beam can be optimized by adjusting the polarization controller 124. When the output power of the pump source 110 increases from 36.4 mW to 128.7 mW, the output power of the erbium-doped fiber 122A increases from 0.69 mW to 19.38 mW, and the pulse energy increases from 0.16 µJ to 0.8 µJ. In FIG. 7, when the repetition frequency increases from 4.36 kHz to 24.3 kHz, the duration of single pulse (referred to as "pulse bandwidth" below) decreases from 23.8 µs to 3.34 µs. It should be noted that "the repetition frequency increases as the pump power increases, while the pulse bandwidth increases as the pump power decreases" is one typical phenomenon of the Q-switched laser system, and this phenomenon demonstrates that the operation of the passively Q-switched fiber laser is successfully realized by the first embodiment.

The table below lists the pulse laser output power, the maximum pulse energy and the repetition frequency of the erbium-doped fiber Q-switched laser system employing traditional CNTs and graphene as the saturable absorber and the passively Q-switched fiber laser system 100 employing the PbS QD polymer composite film 126a as the saturable absorber 126 in the first embodiment measured under the same pump power. Compared with traditional technique, the passively Q-switched fiber laser system in the first embodiment obviously has several times higher maximum output power and maximum pulse energy.

|  | CNTs | graphene | PbS QD polymer composite film |
|---|---|---|---|
| maximum output power | 225.7 µW | 4.2 mW | 19.38 mW |
| maximum pulse energy | 14.1 nJ | 90 nJ | 800 nJ |
| repetition frequency | 16 kHz | 45 kHz | 24 kHz |

(The second embodiment) As shown by the absorption spectrum of the PbS QD polymer composite film 126a in FIG. 3, it can be seen that there is also a strong absorption at the wavelength of 1064 nm, and the pulsed laser beam with the wavelength of 1064 nm is widely applied in biomedical and cosmetics fields, so the passively Q-switched fiber laser system 100 employs the PbS quantum-dot polymer composite film 126a as its saturable absorber 126. Different from the first embodiment, in the second embodiment, the erbium-doped fiber 122A is changed to ytterbium-doped fiber 122B with the same length of 2 meters, and in this two embodiments, only the gain fiber is different, other elements and configurations are the same. In the second embodiment, the ytterbium ion ($Yb^{3+}$) in the ytterbium-doped fiber 122B is stimulated by the pump beam $L_S$ with a wavelength of 976 nm to release a stimulated laser beam $L_e$ with a wavelength of 1.064 µm. And, the pulsed laser beam $L_P$ is produced by passively Q-switched operation after the stimulated laser beam $L_e$ with a wave length of 1.064 µm is absorbed by the PbS quantum-dot polymer composite film 126a.

The passively Q-switched fiber laser system 100 in the second embodiment has a slope efficiency of 14.68%, which is still higher than that of the passively Q-switched fiber laser system employing traditional saturable absorber material. When the pump power increases from 123.22 mW to 184.37 mW, the output power of the ytterbium-doped fiber increases from 1.16 mW to 8.91 mW, and the pulse energy increases from 0.12 µm to 0.27 µm; the repetition frequency increases from 9.23 kHz to 33.11 kHz, and the pulse bandwidth decreases from 5.8 µs to 1.8 µm. Compared with traditional technique, the passively Q-switched fiber laser system 100 in the second embodiment obviously still has several times higher maximum output power and maximum pulse energy.

(The third embodiment) Different from the second embodiment, in the third embodiment, the ytterbium-doped fiber 122B is changed to ytterbium-doped fiber 122B with the same length of 50 cm, and the passively Q-switched fiber laser system 100 is optimized by equipping with the directional coupler with different reflectivity R, wherein other elements and configurations are all the same as the second embodiment. The ytterbium-doped fiber 122B with a length of 50 cm may completely absorb the pump beam without existing the problem of self-absorption.

When the reflectivity R is 50%, increasing the pump power from 109 mW to 156 mW, the repetition frequency of the passively Q-switched fiber laser system 100 increases from 14.43 kHz to 31.57 kHz, and the pulse bandwidth decreases from 8.44 µs to 2.53 µm. When the pump power is 156 mW, the average output power of the ytterbium-doped fiber reaches 12.34 mW, and the slop efficiency is 21.63%. When the pump power is 153 mW, the peak power of the ytterbium-doped fiber reaches 0.159 W. When the pump power is 147 mW, the maximum pulse energy reaches 404 nJ, which is higher than that of the passively Q-switched fiber laser system employing traditional CNTs or graphene as saturable absorber.

In above embodiments, the slope efficiency and laser threshold of the passively Q-switched fiber laser system 100 can be optimized by changing the reflectivity R of the directional coupler 125 in the ring cavity 120. The pulse bandwidth can be further shortened by changing the length of the ring cavity 120 or the modulation depth of the pulsed laser beam output from the PbS QD polymer composite film 126a. The saturable absorber 126 can be optimized by changing the material parameter of PbS QD polymer composite film 126a. The thickness of the PbS QD polymer composite film 126a can be changed to 25 µm, the concentration of its contained PbS QD material can be changed to 0.028 mol/L, 0.021 mol/L or 0.014 mol/L. The volume ratio of the PbS QD toluene solution to the colloidal polymer xylene in the mixture may be changed to n:1, where n is a specific value ranged from 0.5 to 4.

Figure 8:
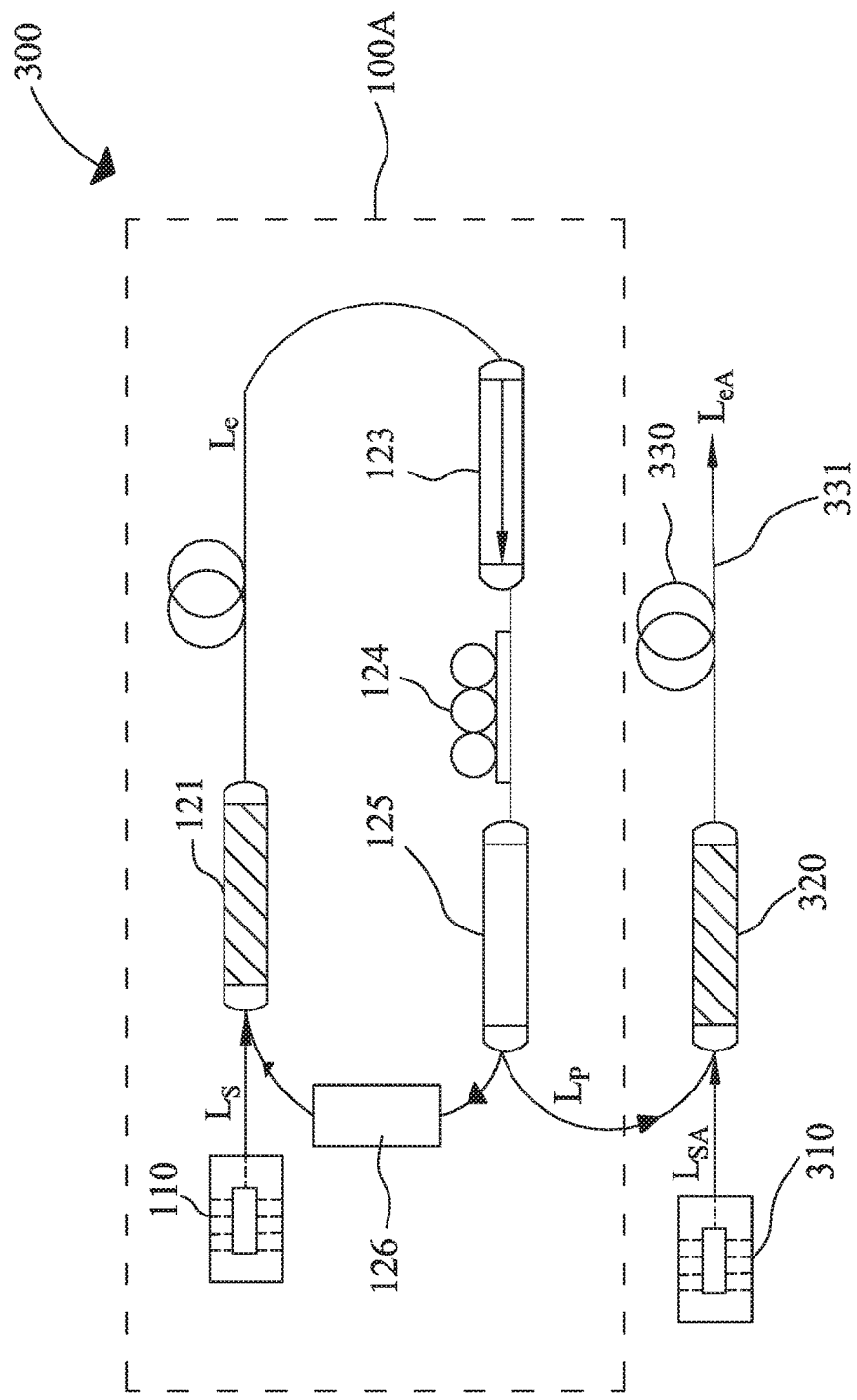
FIG. 8 is a schematic view of the fiber laser amplifier applied in the passively Q-switched fiber laser system according to one embodiment of the present invention.

(The fourth embodiment) In FIG. 8, the passively Q-switched fiber laser system is a fiber laser amplifier 300. Making the optimized passively Q-switched fiber laser system 100 as a seed source 100A of the fiber laser amplifier 300. Additionally, adding a second pump source 310, and the second pump source 310 also has a output wavelength of 976 nm. Coupling the pulsed laser beam $L_P$ output from the output end 1252 of the directional coupler 125 and the linear laser beam $L_{SA}$ output from the second pump source 310 together into a second wavelength division multiplexer 320, then connecting them with a second gain fiber 330 through this wavelength division multiplexer 320. In the fourth embodiment, the second gain fiber 330 is a ytterbium-doped fiber with a length of 1 meter. The linear laser beam $L_{SA}$ output from the second pump source 310 is absorbed by the second gain fiber 330 to produce a stimulated laser beam $L_{eA}$, but as the linear laser beam $L_{SA}$ is affected by the pulsed laser beam $L_P$ of the seed source 100A, the wavelength of the stimulated laser beam $L_{eA}$ can be close or equal to that of the pulsed laser beam $L_P$ of the seed source 100A such that amplification is achieved. Incidentally, if the output end 331 of the second gain fiber 330 is cut by an angle of 8 degrees, the stimulated laser beam $L_{eA}$ can be prevented from emitting back into the fiber laser amplifier 300 after amplification.

In the fourth embodiment, when operating the seed source 100A upon the pump power of the pump source 110 is 160 mW, the original average power of the seed source 100A is 5.72 mW; the pulse energy is 0.164 μJ; the peak power is about 0.06 W. When increasing the output power of the second pump source 310 to about 200 mW, the average power of the seed source 100A is amplified to 37.4 mW; the pulse energy is amplified to 1.07 μJ; while the peak power is amplified to about 0.4 W, which is approximate to 6.5 times the original peak power.

In summary, the basic aspect of a passively Q-switched fiber laser system 100 and the important technical features affecting the effects of the present invention can be concluded from all above embodiments as below.

The passively Q-switched fiber laser system 100 of the present invention is suitable for the pulsed laser beam with a output wavelength of 1 to 2 μm, the basic form of this system comprises a pump source 110 and a ring cavity 120. The assembly of the ring cavity 120 at least includes the gain fiber 122, the directional coupler 125 and the saturable absorber 126 connected in order, the connecting relation among these assemblies refers to FIG. 1. The important technical feature affecting the effect of the present invention is that the saturable absorber 126 utilized by the passively Q-switched fiber laser system 100 is a PbS QD polymer composite film 126a. This PbS QD polymer composite film 126a has two important absorption bands, which are 1000 nm to 1100 nm and 1500 nm to 1600 nm. Therefore, above two absorption bands can be a reference in selecting the gain fiber 122 and the type of its doped ion. In other words, the emission wavelength region of the gain fiber 122 needs to correspond to one of the plurality of absorption bands of the absorber 126. In one embodiment, the gain fiber 122 can be doped with a rare earth ion such as ytterbium ion, erbium ion, thulium ion or neodymium ion to emit the pulsed laser beam at a corresponding emission wavelength region.

Moreover, the method for fabricating the saturable absorber 126 is also a technical feature of the present invention. In the present invention, the PbS QD polymer composite film 126a served as the saturable absorber 126 is a colloidal thin film formed by mixing a PbS QD material with a colloidal polymer and drying them. It should be noted that the material of the saturable absorber 126 includes QDs and polymers, and drying the mixture of the QDs and the polymers needs to change the temperature. Step of drying comprises: drying at a first temperature firstly and then drying at a second temperature, wherein, the second temperature is higher than a first temperature.

The saturable absorber 126 is made from the material of low cost and by simple method, and it is highly cost effective. At the same time, as the saturable absorber 126 has the property of low saturable absorption intensity and a plurality of absorption bands, so it can be used separately with gain fiber of different doped ions or emission wavelength regions. Utilizing this saturable absorber 126 may allow the passively Q-switched fiber laser system 100 to have a plurality of operation bands, and enhance the maximum output power and the maximum pulse energy of the system.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for fabricating a saturable absorber of a passively Q-switched fiber laser system, wherein the passively Q-switched fiber laser system comprises a pump source and a ring cavity connected with each other, wherein the ring cavity comprises a wavelength division multiplexer, a gain fiber, and a directional coupler connected in order, the method comprising steps of:

distributing uniformly a quantum dot material of lead sulfide into a polymer to form a mixture;

subsequently, coating the mixture on a supporter to form a coating;

drying the coating at a first temperature firstly for a first drying stage, then drying at a second temperature for a second drying stage to form a lead sulfide quantum-dot polymer composite film, wherein the first temperature is ranged from 0° C. to 8° C., the first drying stage is a freeze drying process, and the second temperature is ranged from 20° C. to 30° C., the second drying stage is a natural air drying process; and connecting the lead sulfide quantum-dot polymer composite film between the directional coupler and the wavelength division multiplexer, for using the lead sulfide quantum-dot polymer composite film to be the saturable absorber of the passively Q-switched fiber laser system, wherein the saturable absorber has a plurality of absorption bands ranging from 1000 nm to 1100 nm and from 1500 nm to 1600 nm.

2. The method for fabricating the saturable absorber of the passively Q-switched fiber laser system according to claim 1, wherein the freeze drying process is executed for 2 to 3 days, and the natural air drying process is executed for 1 day.

3. The method for fabricating the saturable absorber of the passively Q-switched fiber laser system according to claim 1, further comprising:
   providing a mechanical joint to be connected between the directional coupler and the wavelength division multiplexer; and
   disposing the saturable absorber inside the mechanical joint.

4. The method for fabricating the saturable absorber of the passively Q-switched fiber laser system according to claim 1, wherein the lead sulfide quantum-dot polymer composite film is formed with a concentration of the quantum dot material of lead sulfide ranging from $2 \times 10^{-3}$ mol/L to $2 \times 10^{-1}$ mol/L.

5. The method for fabricating the saturable absorber of the passively Q-switched fiber laser system according to claim 1, wherein the lead sulfide quantum-dot polymer composite film is formed with a thickness larger than 0 μm and less than 100 μm.

\* \* \* \* \*